Oct. 15, 1957     J. E. LUNDBERG     2,809,526
SINGLE AXIS GYROSCOPE
Filed Dec. 23, 1953     2 Sheets-Sheet 1
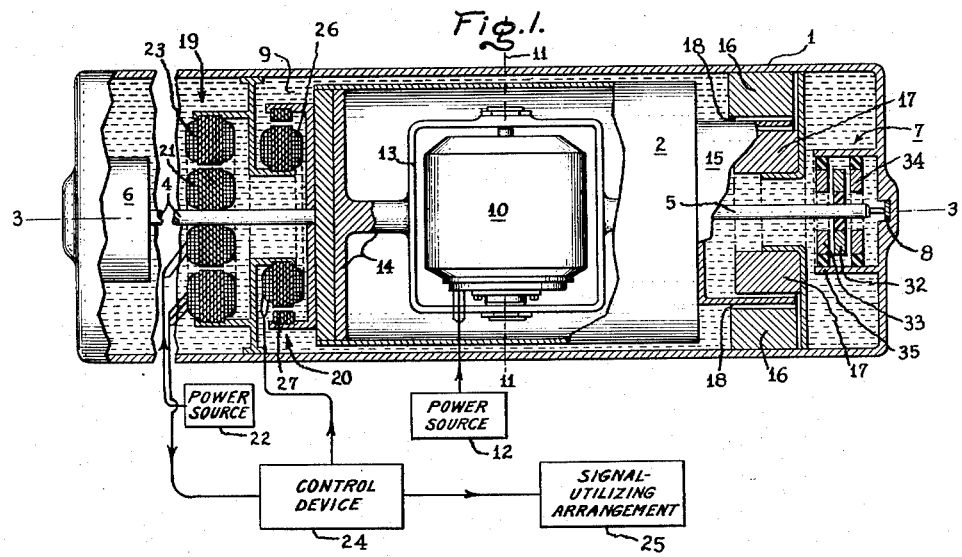
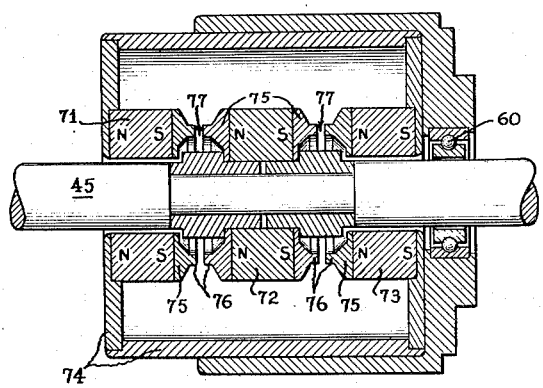
Inventor:
John E. Lundberg,
by Richard E. Hosley
His Attorney.

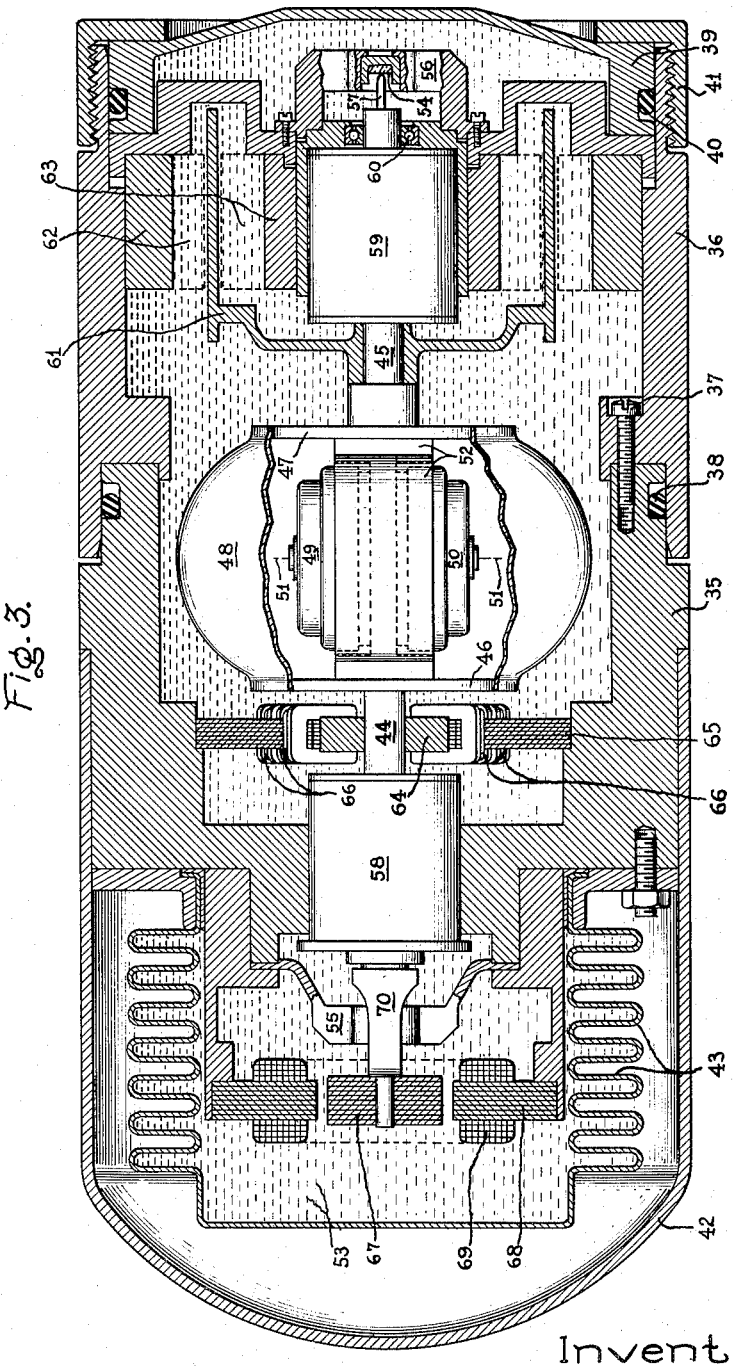

United States Patent Office 2,809,526
Patented Oct. 15, 1957

2,809,526

SINGLE AXIS GYROSCOPE

John E. Lundberg, Johnson City, N. Y., assignor to General Electric Company, a corporation of New York Application December 23, 1953, Serial No. 400,000

16 Claims. (Cl. 74—5)

The present invention relates to gyroscopic devices and, more particularly, to improved gyroscopes of the single axis type.

Although the three-degree-of-freedom gyroscope construction is a well known and advantageously straightforward arrangement for utilizing the spatial rigidity characteristics of a rapidly-spinning high-inertia gyro rotor, increasing use is being made of relatively complex systems incorporating single axis gyroscopes to achieve the higher sensitivities and accuracies which are demanded for many control and stabilizing purposes. Unlike the conventional universally-gimballed device, the single axis gyroscope possesses but a single pivotal support axis in addition to the rotor spin axis, the spin and support axes being perpendicular, and advantage is taken of the fact that angular movement about a third axis perpendicular to both of these axes results in a precession about the single support axis. Sensing of movements about several reference axes of a craft, such as a missile, is accomplished by several single axis gyroscopes, one ordinarily being employed for each reference axis.

On certain embodiments of single axis gyros it has been customary to provide a spring restraint about the single pivotal axis, whereupon precessional movement is critically restrained and the angular deflections about the pivotal axis are caused to characterize the rate of turn sensed about the axis normal to both the spin and pivotal axes. However, such single axis gyros are commonly used with electrical pick-offs which detect the angular deflections and transmit signals to servo apparatus which produces movement of the supporting structure to compensate for the original turning movement. Examples of objects carrying these gyroscopes and stabilized by the associated servo mechanisms include aircraft, missiles, turrets and optical or radar tracking systems. In this type of system arrangement, the servo apparatus must respond readily and unerringly, else the spring torque will act to move the gyro back to its original position independently of the servo equipment and the latter will not be capable of making the full correction which is needed. As a result of such momentary failures of the servo equipment, the support structure slaved by it assumes false orientations, and permanent and unpredictable errors are introduced because the servo equipment cannot respond to intelligence signals lost due to the spring action. Highly critical spring characteristics and adjustments are among further disadvantages.

Efforts made to correct for these deficiencies electronically have involved complex equipment and have introduced difficult problems in relation to the production and combination of appropriate electrical signals without losses in accuracies. It has been found that the required "memory" or integration of gyro signals may be advantageously secured in the single axis gyroscope unit itself, however, by eliminating the spring restraint and utilizing a viscous restraining medium which opposes precession about the pivotal support axis but does not impose a restoring torque such as appears when a spring is used. These arrangements include a sealed chamber which surrounds the gyro rotor structure and which is immersed in a highly viscous liquid which fills the spaces intermediate the chamber and an outer casing. The viscous fluid serves as a restraining medium, opposing precessional movement about the single pivotal axis, such that the angular deflection about that axis is in proportion to the rate of turning movement about the axis normal to both the pivotal and spin axes. Under static conditions, no restoring torque is impressed by the fluid, thereby eliminating the cardinal disadvantage of spring restraints. Further, the flotation afforded by the fluid reduces bearing loads about the pivotal axis and yields greatly improved friction and shock characteristics.

The viscous-restrained gyroscope is not without disadvantages, however, the principal one of these being its highly undesirable sensitivity to temperature variations. Within the expected range of temperatures at which gyroscopic devices must operate satisfactorily, the density of the viscous fluid varies so widely as to permit the buoyant chamber surrounding the rotor to impose markedly different loads upon the pivot axis support bearings. The attending changes in bearing friction vary the restraint about the pivot axis, inasmuch as this restraint is the combination of both friction and viscous restraint components. In addition, the temperature changes seriously alter the viscosity of the restraining medium, whereupon the restraint characteristics are further disturbed and the operation of the gyroscope is seriously in error. These deleterious effects may be overcome by continuously regulating the temperature of the gyro unit, as with electrical heating elements, but the result is merely to replace the former disadvantages with those of increased power consumption, very much extended warm-up or starting times for the instrument, and additional components for the accurate regulation of temperature.

Accordingly, this invention has as one of its objects the provision of a single axis gyroscope the operation of which is unaffected by temperature fluctuations.

A second object is to provide an improved single axis gyroscope of the highest precision and ruggedness.

Further, it is an object to provide a low-friction single axis integrating gyroscope which has operating characteristics divorced from influences of temperature variations.

By way of a summary account of one aspect of this invention, I provide a gyro rotor structure which is encased within a sealed container and is provided with a pivotal axis support shaft extending perpendicular to the rotor spin axis, these elements being surrounded by a sealed outer housing. Space intermediate the sealed container and outer housing is filled with a fluid having a very low viscosity even at the lowest temperatures likely to be experienced, and the container is constructed without appreciable surface irregularities which would incur viscous drag. Thus, the viscous drag forces are intentionally suppressed to the point of being negligible at all times, and the fluid is employed solely for the purpose of buoying the container and other parts supported by it. Preferably, the container is dimensioned and the fluid selected such that, at a normal operating temperature, the container is buoyed by a force equal to the weight of all gyro components which must be supported about the pivotal axis. This neutral suspension not only lessens shock loading but reduces the ordinary loading along the pivotal axis to a minute value which may be borne adequately by magnetic-suspension bearings. Magnetic support is particularly advantageous because there is no frictional contact between relatively rotatable members, and these members may even be permitted to move radially in relation to one another, when fluid density variations with temperature change the buoyant force and thus the loading on the support axis, without introducing friction about the support axis. Consequently, no restraint about the pivotal axis can be attributed to bearing frictions, and this undesired variable is eliminated. Restraint opposing precession of the gyroscope is afforded by a magnetic damping assembly comprised of an eddy-current drag member movable with the gyro pivot shaft, and permanent magnets supported by the outer casing. This magnetic restraining assembly possesses restraint characteristics which are substantially unaffected by temperature fluctuations.

Although the features of this invention which are believed to be novel are set forth in the appended claims, the details of the invention itself and further objects and advantages thereof may be most readily comprehended by reference to the following description taken in connection with the accompanying drawings, wherein:

Figure 1 illustrates, in partly pictorial and partly sectionalized side view, one construction of a single axis gyro in conformity with my invention, together with system components;

Figure 2 is a plot of load vs. deflection characteristic of a magnetic suspension arrangement supporting a single axis gyro rotor structure;

Figure 3 represents constructional detail of one preferred embodiment of my invention; and Figure 4 illustrates a magnetic suspension for use in the single axis gyroscope of this invention.

One arrangement for practicing this invention is shown in Figure 1 of the drawings as comprising a generally cylindrical outer structure or housing 1 within which a sealed hollow container 2 is supported along the longitudinal axis 3—3 by journals 4 and 5. As is more fully described later herein, journals 4 and 5 are radially suspended in housing 1 by magnetic suspension units 6 and 7, with axial play precluded by end-thrust bearings such as that identified by numeral 8. A minimum-viscosity liquid 9 is illustrated in the spaces intermediate the sealed container 2 and outer housing 1, this liquid and the dimensions of the container being selected such that the container is buoyed by a force substantially equal to the combined weight of the container and all components supported with it. Within container 2, there is mounted a gyroscope rotor 10 which is rotated at high speed about the spin axis 11—11 by electric motive means (not visible) energized from a power supply 12. Gimbal 13 and frame 14 provide a mounting for the gyro rotor shaft and motive means. Restraint about the axis 3—3 is afforded by an eddy-current damping assembly comprised of a cup-shaped conductive element 15, attached to container 2, and inner and outer annular permanent magnet units 16 and 17 which are affixed to outer housing 1. Cup-shaped drag element 15 is positioned in the annular gap 18 between magnet units 16 and 17, where it is cut by the high-intensity magnetic field appearing there and causes restraint of relative angular movement between casing 1 and gyro container 2.

In one of its uses as a single axis gyroscope, the arrangement includes an electrical pick-off 19 and torque motor 20, each of which has a rotor element fixed in relation to the container 2 and a stator fixed in relation to the outer casing 1. Thus, the pick-off rotor 21 is mounted on journal 4 and is excited by signals from source 22 such that the phase and amplitude of output signals appearing in the casing-mounted stator 23 will characterize the angular relationship of casing 1 and container 2 about the single axis of freedom 3—3. These output signals are delivered to an appropriate control device, 24, which preferably includes a discriminator-amplifier unit for applying appropriate signals to the signal-utilizing device 25, which may comprise servos and other apparatus for correcting the heading of the craft supporting the gyro and thus for reducing the pick-off signal to a null value. Control device 24 may also be arranged to apply suitable control signals to the casing-mounted stator 26 of torque motor 20, for the purpose of driving the container-mounted torque motor rotor 27 in one or the other angular direction about axis 3—3 and, thereby, to orient the gyro spin axis 11—11 properly whenever necessary.

Magnetic suspension units 6 and 7 possess load vs. radial deflection characteristics similar to those represented in Figure 2. As the radial load imposed through shafts 4 and 5 increases with a lowering of the density of the buoying liquid with increased temperature, the downward or positive deflection 28 is proportional to the load. A drop in temperature from the optimum operating temperature results in increased liquid density, increased buoying of the container 2, and an upward or negative deflection of shafts 4 and 5 which plot 29 shows to be proportional to this reversed loading also. Dashed lines 30 and 31 define the conditions at temperatures of −55° C. and +70° C., respectively, the deflections from null being about 0.001 inch in each instance for one system construction. Such a suspension is sufficiently "stiff" to present no obstacle to proper operation of the gyroscope, and yet the torques introduced by the suspension are so minute and constant as to be negligible within the large range of permissible temperature variations.

Referring to Figure 1 once again, the radial magnetic suspension units 6 and 7 are there found disclosed in greater detail in the cross-sectioned representation of unit 7. Attached to shaft 5 is an annular magnetized member 32 which is of about the same radial dimensions as the two annular magnetized members 33 and 34 disposed one on each side thereof and mounted on hub 35 of casing 1. A small gap separates center member 32 from the side members 33 and 34, such that there is no frictional contact between them, and the members are permanently magnetized to cause attraction between the center member and each of the side members. End thrust bearings on each end of shafts 4 and 5 preserve the axial relationship shown, while permitting small radial deflections, one such bearing being designated by numeral 8. The attractions mentioned tend to maintain radial alignment of the center and side magnetized members, thereby providing a radial support, and the polarizations of the members may be made of such uniformity that angular locking torques are virtually eliminated. Further magnetized members may be added to the stack to increase the radial "stiffness" of the bearings.

At the normal operating temperature at which the liquid 9 just buoys the container 2 and all the parts supported with it, the suspension units 6 and 7 permit no radial deflection of shafts 4 and 5, and the assembly is in neutral equilibrium. When gyro rotor 10 is spun at high speed about spin axis 11—11, any movement of the assembly about an axis normal to both the spin axis 11—11 and support axis 3—3, occasions characteristic precessional torques about support axis 3—3, the angular sense of these torques being dependent upon the angular direction of such movement and the direction of spin of gyro rotor 10. In an installation aboard a supporting aircraft, for example, the assembly is conventionally positioned with its spin and support axes normal to the craft's sensitive axis about which turning movements are to be detected. Unless angular restraint is provided about the support axis, such as axis 3—3, turning movements about the sensitive axis would cause rapid precession about the support axis until the spin axis became aligned with the sensitive axis or until limit stops were struck. Practically, gyroscopes of this nature are not permitted to precess through very large angles, and, preferably, the angular precession about the support axis is made proportional to the rate of turning about the support axis by introducing restraints such as the earlier-mentioned viscous or spring restraint. The present arrangement successfully avoids the undesirable aspects of both viscous and spring restraints by a magnetic damping arrangement comprised of conductive cylinder 15 and the cooperating permanent magnets 16 and 17.

It has already been pointed out that spring restraints are objectionable because, while they resist precessional movements about the support axis, they also detrimentally reflect opposing torques when the precessional forces disappear and the associated servo equipment has momentarily failed to cause a cancelling of the turning movements about the sensitive axis. This disadvantage is particularly serious, as is evidenced by the fact that it is sought to be avoided even though spring restraints make it possible to eliminate all bearings about the support axis, the springs also serving as radial and axial supports in these constructions. Single axis gyroscopes which are restrained by the viscous liquids in which they are immersed afford a considerable advantage, although temperature variations cause viscosity changes which alter the restraints and occasion errors in the formation conveyed by angular deflections about the support axis of any such gyroscope. The magnetic drag arrangement illustrated in Figure 1 possesses the advantageous integrating or nonresilient characteristic, and is also substantially independent of temperature influences in the required operating range. Whatever temperature compensations may be found desirable to further enhance accuracies may be achieved through the use of simple and permanent fixed shunts of known types. In addition, it should be noted that the moving element 15 supported with the magnetically-suspended components is a thin conductive element which adds only a very small weight to the supported structure, the heavy magnets being mounted with the outer casing.

The magnetic suspension units, 6 and 7, and the magnetic drag unit are in a complementary operating relationship. In this connection, it is noted that both are frictionless about the support axis 3—3, and thus they introduce no variable frictional restraint about this axis either singly or in combination. Both the suspension and restraint are characterized by their independence from temperature effects. Further, the frictionless magnetic suspensions permit the angular restraint to remain only that imposed by the magnetic restraining assembly, which is the type of restraint ideally suited to the single axis gyroscope; and the uniform restraining characteristic of the magnetic restraining unit even under deflection conditions makes possible the use of frictionless magnetic suspensions which also experience small radial deflections. In those instances where a non-viscous liquid is employed to buoy the magnetically-suspended members, there are the further interrelationships in that the liquid adds no material angular restraint to that of the magnetic drag assembly so that the variations in viscosity may be neglected, and in that the buoyant effects of the liquid may aid the magnetic suspension units in providing frictionless support.

The precessional movement which turning about the sensitive axis causes about the support axis 3—3 is opposed by the restraint of conductive member 15 occasioned by its cutting of the concentrated magnetic field appearing across gap 18 between annular permanent magnets 16 and 17. Nevertheless, relative angular movement of casing 1 and shafts 4 and 5 does commence, in proportion with the rate of the turning motion about the sensitive axis of the supporting craft, whereupon the pick-off 19 senses the angular displacement and delivers a characterizing electrical signal to the control device 24. In turn, device 24 feeds an output signal to the signal utilizing arrangement 25, the latter usually serving to move the casing 1 about the sensitive axis to compensate exactly for the original turning movement. When a supporting aircraft is involved, arrangement 25 might comprise servo apparatus and control surfaces which would turn the craft to achieve the required compensating motion. Each excursion of the craft which yields a pick-off output signal thus results in another and opposite excursion which returns the pick-off to a null orientation.

In the event that some influence momentarily prevents the servo system from accomplishing the required correction in the craft orientation, the pick-off signal remains unchanged and stands by to indicate that a correction is still needed. An integration or storage characteristic is provided in this manner by the magnetic restraining arrangement, whereas spring restraints would return the pick-off to a null condition during lapses in servo function and would occasion serious error in the resulting attitude of the supporting craft.

Torque motor 20 may be energized through control device 24 to position the gyro rotor spin axis 11—11 accurately. By way of illustration, this may be done when the gyro is first set in operation, or when a compensation is made for trim of the supporting craft, such that the spin axis and support axis will both be normal to the sensitive axis.

Details of a preferred gyro unit construction appear in Figure 3, wherein the generally cylindrical outer casing includes subassemblies 35 and 36 rigidly connected by bolts such as 37 and sealed in a fluid-tight relationship by a gasket 38. One end is closed by a cap 39 which is sealed to subassembly 36 by a gasket 40 and is fixed in position by an annular clamping member 41 threaded onto subassembly 36. The opposite end is capped externally by a cylindrical closed-end cover 42 which is fitted upon subassembly 35. Within and protected by cover 42 is a metal expansion bellows 43 which is affixed to subassembly 35 by bolts and sealed in fluid-tight relationship with it to form a totally sealed chamber. Shafts 44 and 45 within this chamber are attached to end plates 46 and 47, respectively, of a liquid-tight gyro container which these plates form in conjunction with the shell 48, the two shafts being collinear along an axis which is the single pivotal support axis for the gyroscope. The gyro rotor halves 49 and 50 are rotated at high speed about spin axis 51—51 inside this container, the support for the rotor halves and electrical rotor motor being provided by a frame 52 extending between container end plates 46 and 47. Gyro rotor structures of this type are disclosed in the copending application of Harry C. Wendt, Serial No. 325,577, filed December 12, 1952, for "Symmetrical Gyroscope," the assignee being the same as that of the present application. The sealed container for the gyro rotor halves 49 and 50 is so dimensioned that it neutrally buoys all the weight supported by it when wholly immersed in the non-viscous liquid 53 which fills the sealed chamber, defined by bellows 43, subassemblies 35 and 36, and end cap 39. Lateral movements of the shafts 44 and 45 are limited by surfaces of bearing members, such as 54, which are set in end brackets 55 and 56 affixed to subassemblies 35 and 36, respectively. Preferably, shafts 44 and 45 are provided with slender projections, such as 57, which may abut members such as 54 without introducing significant frictions about the axis of these shafts. Magnetic suspension units 58 and 59 are also affixed to subassemblies 35 and 36, respectively, to afford frictionless support of shafts 44 and 45, while load bearings of conventional design, such as bearing unit 60, are positioned to engage and further support the shafts only if extreme shock forces or serious injuries prevent the magnetic suspension units from accomplishing the full support needed to protect against damage.

A lightweight conductive cylindrical restraining member 61 is attached to shaft 45 and extends through the annular gap which appears between the concentric permanent magnet members 62 and 63 supported with subassembly 36. As they appear in Figure 3, magnets 62 and 63 are not fully cross-hatched between their innermost and outermost dimensions, inasmuch as the cross-section is taken along a plane passing intermediate radially-extending pole pieces of these magnets. A pick-off is illustrated as comprising a magnetic material rotor 64, attached to shaft 44, and a stator core 65 and excitation and output windings 66, affixed to subassembly 35. Such variable impedance pick-offs with unwound rotors are well known to those skilled in the art. A torque motor for exerting torques about the support axis may also be of a known type having an unwound rotor, 67, and a stator core 68 and winding 69 fixed with subassembly 35. In the arrangement shown, the rotor 67 is positioned out beyond the end bracket 55, this assembly being permitted by a ring-shaped coupling member 70 which encircles the hub of bracket 55.

Constructional detail of a suitable magnetic suspension unit is also presented, in Figure 4, wherein unit 59 of Figure 3 is illustrated in a cross-sectional view. This unit includes three annular permanent magnets 71, 72 and 73 which are collinear and are permanently polarized longitudinally rather than radially. The center magnet 72 is mounted on shaft 45 and the adjacent magnets spaced on either side of it, 71 and 73, are rigidly positioned in an outer frame 74. Oppositely-disposed surfaces of these magnets are bonded with magnetic material 75 which distributes the poles in such manner as to insure uniform pole strengths around the narrow annular projections or pole faces 76 formed of this material. Narrow gaps 77 appear between adjacent ones of projections 76 so that the magnet on shaft 45 does not frictionally engage the magnets on frame 74. Polarization of the magnets is patterned to produce opposite poles across gaps 77, whereby the forces across these gaps are wholly attractive. Accordingly, the narrow annular pole faces 76 tend to maintain radial alignment and yield a radially "stiff" suspension when other means are present to prevent axial movement. Pole face material 75 aids in eliminating angular locking torques which might result from non-uniform distributions of polarizations along pole faces 76.

Although this invention utilizes the buoyancy of a non-viscous liquid in a preferred embodiment, it is possible to eliminate such liquid buoying features in these arrangements wherein the magnetic suspension has greater stiffness and the assembly supported along the single support axis is of reduced weight. This latter arrangement may be realized with a small gyroscope, and with lightweight support shafts and pick-off and torque motor rotors, used in conjunction with magnetic suspension units having a larger number of stacked permanent magnet members. Magnetic damping contributes very little weight because the conductive member may be made of aluminum or other light metals.

It is intended that the conductive magnetic drag member may have a disk-like or other shape, and that electromagnetic rather than permanent magnet means may be used in the magnetic restraint assembly. Other arrangements and selections of components will fall within the realm of obvious design changes.

While particular embodiments of this invention have been shown and described herein, it will occur to those skilled in the art that various modifications and substitutions can be effected without departing either in spirit or scope from the invention set forth in the appended claims.

What I claim as new and desire to secure by Letters Patent of the United States is:

1. Gyroscopic apparatus comprising a gyro rotor, means for spinning said rotor at high speed about its spin axis, journalling means for supporting said rotor about a support axis normal to said spin axis, relatively stationary support means, magnetic means radially suspending said journalling means in said support means about said support axis, low-friction means preventing relative axial movement between said journalling means and said support means along said support axis, and non-resilient non-frictional means restraining relative angular movement of said journalling means and said support means about said support axis.

2. Gyroscopic apparatus comprising a gyro rotor, means for spinning said rotor about its spin axis, journals for supporting said rotor about a support axis normal to said spin axis, relatively stationary support means, magnetic means magnetically suspending said journals laterally in said support means, low-friction means preventing axial displacement of said journals along said support axis, and non-frictional means restraining relative angular movement of said journalling means and said support means about said support axis.

3. Gyroscopic apparatus comprising a gyro rotor, motive means spinning said rotor about its spin axis, a relatively stationary support, permanent magnet means magnetically suspending said rotor in said support laterally about a support axis normal to said spin axis, low-friction means preventing axial displacement of said rotor in said support along said support axis, and non-resilient non-frictional means restraining relative angular movement of said rotor and said support about said support axis.

4. Gyroscopic apparatus comprising a gyro rotor, motive means spinning said rotor about its spin axis, a relatively stationary support, bearing means supporting said rotor in said support for angular movement about a support axis normal to said spin axis, said bearing means including permanent magnet means magnetically suspending said rotor in said support laterally about said support axis, and magnetic damping means non-resiliently restraining relative angular movement of said rotor and said support about said support axis.

5. Gyroscopic apparatus comprising a gyro rotor, motive means spinning said rotor about its spin axis, a relatively stationary support, bearing means supporting said rotor in said support for angular movement about a support axis normal to said spin axis, said bearing means including permanent magnet means magnetically suspending said rotor in said support laterally about said support axis, means producing a magnetic field, and a conductive member disposed to interact with said magnetic field, one of said field-producing means and conductive member being fixed in relation to said rotor about said support axis and the other being fixed in relation to said support.

6. Gyroscopic apparatus comprising a gyro rotor, motive means spinning said rotor about its spin axis, a relatively stationary support, bearing means supporting said rotor in said support for angular movement about a support axis normal to said spin axis, said bearing means including permanent magnet means magnetically suspending said rotor in said support laterally about said support axis, means affixed to said support for producing a magnetic field, and a conductive member fixed to pivot with said rotor about said support axis and disposed to interact with the magnetic field from said field-producing means.

7. Gyroscopic apparatus comprising a gyro rotor, motive means spinning said rotor about its spin axis, journalling means for supporting said rotor about a support axis normal to said spin axis, a relatively stationary support, first permanent magnet means magnetically suspending said journalling means in said support laterally about said support axis, low-friction means preventing relative axial movement between said journalling means and said support along said support axis, second permanent magnet means mounted on said support, and a conductive eddy-current member fixed in relation to said journalling means and disposed to interact with the magnetic field of said second permanent magnet means to restrain relative angular movement of said journalling means and said support about said support axis.

8. Gyroscopic apparatus comprising a liquid-tight enclosure; a gyro rotor structure within said enclosure; a sealed container within said enclosure and surrounding said rotor structure, relatively stationary support means, bearing means supporting said rotor structure and said container in said support means for angular movement about a support axis normal to the spin axis of said rotor structure, said bearing means including permanent magnets magnetically suspending said rotor structure and said container in said support means laterally about said support axis, and a non-viscous liquid intermediate said enclosure and container, said container being dimensioned and said liquid having a density which cause said container and rotor structure to be substantially neutrally buoyed in said enclosure, and said container having surface regularity and said liquid having a viscosity which render viscous restraint of said container about said support axis substantially negligible.

9. Gyroscopic apparatus comprising a liquid-tight enclosure; a gyro rotor structure within said enclosure; means for buoying substantially all the weight of said rotor structure within said enclosure comprising a sealed container within said enclosure and surrounding said rotor structure, and a substantially non-viscous liquid intermediate said enclosure and container buoying said container and rotor structure, said container having a configuration which minimizes viscous restraint thereof by said liquid about a support axis substantially normal to the spin axis of said rotor structure; relatively stationary support means; and bearing means supporting said rotor structure and said container about said support axis, said bearing means including permanent magnets magnetically suspending said rotor structure and said container in said support means laterally about said support axis.

10. Gyroscopic apparatus comprising a liquid-tight enclosure; a gyro rotor within said enclosure; means for buoying said rotor to compensate for the weight thereof comprising a sealed container within said enclosure and surrounding said rotor, and a substantially non-viscous liquid intermediate said container and said enclosure, said container having a configuration which minimizes viscous restraint thereof by said liquid about a support axis normal to the spin axis of said rotor; relatively stationary support means; and magnetic means magnetically suspending said rotor in said support means laterally about said support axis.

11. Gyroscopic apparatus comprising a liquid-tight enclosure; a gyro rotor within said enclosure; means for buoying said rotor to compensate for the weight thereof comprising a sealed container within said enclosure and surrounding said rotor, and a substantially non-viscous liquid intermediate said container and said enclosure, said container being shaped to minimize viscous restraint thereof by said liquid about a support axis normal to the spin axis of said rotor; relatively stationary support means; permanent magnet means magnetically suspending said buoyed rotor in said support means laterally about said support axis; and low-friction means axially aligning said buoyed rotor in said support means along said support axis.

12. Gyroscopic apparatus comprising a liquid-tight enclosure, a gyro rotor within said enclosure, motive means within said enclosure for rotating said rotor about its spin axis, a pair of collinear journals for supporting said rotor about a support axis normal to said spin axis, a sealed container within said enclosure and surrounding said rotor, means for reducing the load on said journals including a substantially non-viscous liquid intermediate said container and said enclosure, said liquid being of such low viscosity and said container being of such surface regularity that viscous restraint of said container about said support axis is minimized, and a pair of magnetic suspension units each magnetically supporting a different one of said journals laterally about said support axis in said enclosure, said units each including at least three collinear axially-spaced annular permanent magnets polarized longitudinally and with oppositely-disposed surfaces oppositely polarized, the center magnets of said units being fixed with one of said journals and enclosure and the outer magnets of said units being fixed with the other of said journals and said enclosure.

13. Gyroscopic apparatus comprising a liquid-tight enclosure; a gyro rotor within said enclosure; means for buoying said rotor to compensate for the weight thereof comprising a sealed container within said enclosure and surrounding said rotor, and a substantially non-viscous liquid intermediate said container and said enclosure, said container being shaped to minimize viscous restraint thereof by said liquid about a support axis normal to the spin axis of said rotor; permanent magnet means magnetically suspending said buoyed rotor in said enclosure laterally about said support axis; and magnetic damping means non-resiliently restraining relative angular movement of said rotor and said enclosure about said support axis.

14. Gyroscopic apparatus comprising a liquid-tight enclosure; a gyro rotor within said enclosure; means for buoying said rotor to compensate for the weight thereof comprising a sealed container within said enclosure and surrounding said rotor, and a substantially non-viscous liquid intermediate said container and said enclosure, the exterior of said container being shaped to minimize viscous restraint thereof by said liquid about a support axis normal to the spin axis of said rotor; bearing means supporting said rotor in said enclosure for angular movement about said support axis, said bearing means including permanent magnets magnetically suspending said rotor and container in said enclosure laterally about said support axis; means producing a magnetic field; and a conductive member disposed to interact with said magnetic field to produce a non-resilient restraint about said support axis; one of said field-producing means and conductive member being fixed in relation to said rotor about said support axis and the other being fixed in relation to said enclosure.

15. Gyroscopic apparatus comprising a liquid-tight enclosure, a gyro rotor structure including a rotor mounted for rotation about its spin axis in said enclosure, a container sealing off said rotor in a liquid-tight chamber, a substantially non-viscous liquid intermediate said container and said enclosure for buoying said rotor structure, permanent magnet means magnetically suspending said rotor structure in said enclosure laterally about a support axis normal to said spin axis, low-friction means preventing axial movement of said rotor structure in said enclosure along said support axis, a conductive eddy-current member fixed in relation to said rotor structure about said support axis, and magnet means fixed in relation to said enclosure and disposed to produce a magnetic field which interacts with said eddy-current member when relative angular movement occurs between said rotor structure and enclosure about said support axis.

16. Gyroscopic apparatus comprising a liquid-tight housing, a gyro rotor within said housing, motive means for rotating said rotor about its spin axis, a pair of collinear journals supporting said rotor and motive means about a support axis normal to the spin axis of said rotor, a liquid-tight container enclosing said rotor and motive means, a substantially non-viscous liquid intermediate said housing and container for buoying said rotor and motive means, said container being regularly shaped to minimize viscous restraint thereof by said liquid about said support axis, a pair of magnetic suspension units each magnetically supporting a different one of said journals in said housing and laterally about said support axis, said units each including at least three collinear axially-spaced annular permanent magnets polarized longitudinally and with oppositely-disposed surfaces oppositely polarized, the center magnets of said units being fixed with said journals and the outer magnets of said units being fixed with said housing, low-friction bearing members fixed with said housing and preventing longitudinal movement of said journals along said support axis, permanent magnet means fixed with said housing and producing high-intensity magnetic field, and a conductive eddy-current member fixed with said journals for pivotal movement therewith disposed to intercept said magnetic field.

References Cited in the file of this patent

UNITED STATES PATENTS

| | | |
|---|---|---|
| 1,213,692 | Rossiter et al. | Jan. 23, 1917 |
| 2,349,287 | Krussmann | May 23, 1944 |
| 2,380,079 | Schwien | July 10, 1945 |
| 2,419,063 | Fischer | Apr. 15, 1947 |
| 2,582,788 | Mendelsohn | Jan. 15, 1952 |
| 2,620,668 | Lundberg | Dec. 9, 1952 |
| 2,662,410 | Ballard et al. | Dec. 15, 1953 |